(12) United States Patent  (10) Patent No.: US 8,256,123 B2
Lee et al.  (45) Date of Patent: Sep. 4, 2012

(54) DISPLACEMENT SENSING USING A FLEXIBLE SUBSTRATE

(75) Inventors: Fred S. Lee, Mountain View, CA (US); Frank Lambrecht, Mountain View, CA (US)

(73) Assignee: Rambus Inc., Sunnyvale, CA (US)

( * ) Notice: Subject to any disclaimer, the term of this patent is extended or adjusted under 35 U.S.C. 154(b) by 0 days.

(21) Appl. No.: 12/933,876

(22) PCT Filed: Mar. 24, 2009

(86) PCT No.: PCT/US2009/038085
§ 371 (c)(1),
(2), (4) Date: Sep. 21, 2010

(87) PCT Pub. No.: WO2009/151715
PCT Pub. Date: Dec. 17, 2009

(65) Prior Publication Data
US 2011/0005090 A1  Jan. 13, 2011

Related U.S. Application Data

(60) Provisional application No. 61/044,182, filed on Apr. 11, 2008.

(51) Int. Cl.
*G01D 5/14* (2006.01)
*G01B 7/30* (2006.01)
(52) U.S. Cl. .................................. 33/1 PT; 33/1 N
(58) Field of Classification Search .................. 33/1 PT, 33/1 N, 512, 514.2, 534, DIG. 13
See application file for complete search history.

(56) References Cited

U.S. PATENT DOCUMENTS

| | | | | |
|---|---|---|---|---|
| 2,316,203 A | * | 4/1943 | Simmons, Jr. | 338/5 |
| 2,340,146 A | * | 1/1944 | Ruge | 338/2 |
| 2,597,751 A | * | 5/1952 | Ruge | 338/5 |
| 3,991,745 A | * | 11/1976 | Yoslow et al. | 600/594 |
| 4,375,057 A | | 2/1983 | Weise et al. | |
| 4,651,436 A | * | 3/1987 | Gaal | 335/33 |
| 4,897,927 A | * | 2/1990 | Nicol | 33/534 |
| 4,910,877 A | * | 3/1990 | Sokol | 33/544 |
| 5,042,164 A | * | 8/1991 | Eppinger | 33/561.2 |
| 5,086,785 A | | 2/1992 | Gentile et al. | |
| 5,813,406 A | | 9/1998 | Kramer et al. | |
| 6,084,416 A | | 7/2000 | Kishimoto | |
| 6,393,912 B2 | | 5/2002 | Pchelnikov et al. | |

(Continued)

FOREIGN PATENT DOCUMENTS

DE  10314973 A1  11/2004

(Continued)

OTHER PUBLICATIONS

5DT Fifth Dimension Technologies, /http://www.5dt.com/hardware.html webpage, printed on Mar. 26, 2008, 3 pages.

(Continued)

*Primary Examiner* — Christopher Fulton

(57) ABSTRACT

Angular displacement of a flexible substrate is determined based on an electrical change of a mm-wave circuit associated with the flexible substrate. This electrical change may relate to, for example, one or more of a phase shift, an amplitude shift, a frequency shift, or a pulse shift. In some implementations the flexible substrate may include conductors on multiple layers whereby an angular displacement of the flexible substrate causes a relative displacement between conductors of different layers, thereby inducing the electrical change of the mm-wave circuit.

18 Claims, 12 Drawing Sheets

U.S. PATENT DOCUMENTS 7,210,240 B2    5/2007    Townsend et al.
7,248,142 B2    7/2007    Beck et al.

FOREIGN PATENT DOCUMENTS

EP          0564186 A1    10/1993

OTHER PUBLICATIONS

Espacenet English Abstract and Automated Translation of DE10314973A1 (cited above), printed on May 20, 2010, 4 pages.
Images SI Inc., http://imagesco.com/sensors/flex-sensor.html webpage, printed on Mar. 36, 2008, 2 pages.
Measureand Inc., S720 manual, exact date unknown (precedes Oct. 22, 2007), 2 pages.
Simone and Kamper, Design considerations for a wearable monitor to measure finger posture, Journal of NeuroEngineering and Rehabilitation, Mar. 1, 2005, pp. 1-10.
Teamxbox, http://news.teamxbox.com/13250/Sony-Patents-WiimoteKiller-Game-Controller/ webpage, Apr. 13, 2007, 3 pages.
Simone, Lisa K. and Kamper, Derek G., Design Considerations for A Wearable Monitor to Measure Finger Posture, Journal of NeuroEngineering and Rehabilitation; Published Mar. 1, 2005; 10 pages.
Berardini, Cesar A.; "Sony Patents Wiimote-Killer game Controller", 3 pages.
International Search Report and the Written Opinion with mail date of Mar. 31, 2010 re Int'l. Application No. PCT/US2009/038085. 12 Pages.
International Preliminary Report on Patentability and Written Opinion of the International Searching Authority dated Oct. 21, 2010 re International Application No. PCT/US2009/038085. 7 Pages.
Japanese translation of the specification and request for voluntary amendment dated Nov. 20, 2010 re RA613.F.JP (newly filed, application No. unknown as of Dec. 3, 2010). 40 Pages.
EP Response dated Dec. 14, 2010 to the Official Communication dated Nov. 25, 2010 re EP Application No. 09763008.1, includes New Claims (redline and clear copies). 10 pages.
CN Office Action dated Feb. 13, 2012 re CN Application No. 200980116037.8. 8 pages.
CN Response dated Jun. 28, 2012 in CN Application No. 200980116037.8. 19 pages.

* cited by examiner

DISPLACEMENT SENSING USING A FLEXIBLE SUBSTRATE

CLAIM OF PRIORITY UNDER 35 U.S.C. §119

This application claims the benefit of U.S. Provisional Application No. 61/044,182, filed Apr. 11, 2008, the disclosure of which is incorporated by reference herein.

TECHNICAL FIELD

This application relates generally to electromechanical sensing and more specifically, but not exclusively, to a sensor for determining angular displacement.

BACKGROUND

Sensors are often employed in applications where it is desirable to track displacement of a physical object. For example, sensors may be used to track the movement of a component of a machine (e.g., for robotics applications) or of a person's hand or some other body part (e.g., for video game or biomechanical applications).

In some aspects the technology employed in a given sensor depends on the requirements of the corresponding application. Relatively low performance applications commonly employ low cost sensors that are based on Piezo-resistor technology or some other similar technology. For example, a relatively low cost Piezo-resistor-based sensor may be used to coarsely sense movements having a bandwidth on the order of 100 Hz.

In general, such low cost sensors may not be employed in higher performance applications because the inherent characteristics of these sensors may tend to limit their usefulness in such applications. For example, a Piezo sensor may have a low frequency pole-zero doublet that results in slow settling components as well as a device memory and/or device decay effect that increases with use over time. Also, a Piezo sensor may be relatively sensitive to changes in temperature. These characteristics may, in turn, adversely affect the accuracy, resolution, and reliability of sensed measurements. In some cases, feedback techniques may be used to compensate for the doublet in an attempt to improve the bandwidth of the sensor. However, these techniques may involve a difficult pole-zero cancellation operation.

Higher performance applications may employ more accurate, more robust, or higher bandwidth sensors such as Hall effect or optical sensors. However, in general, these types of sensors are more complex and more expensive than lower performance sensors.

BRIEF DESCRIPTION OF THE DRAWINGS

Sample features, aspects and advantages of the disclosure will be described in the detailed description and appended claims that follow and the accompanying drawings, wherein:

Figure 1A:
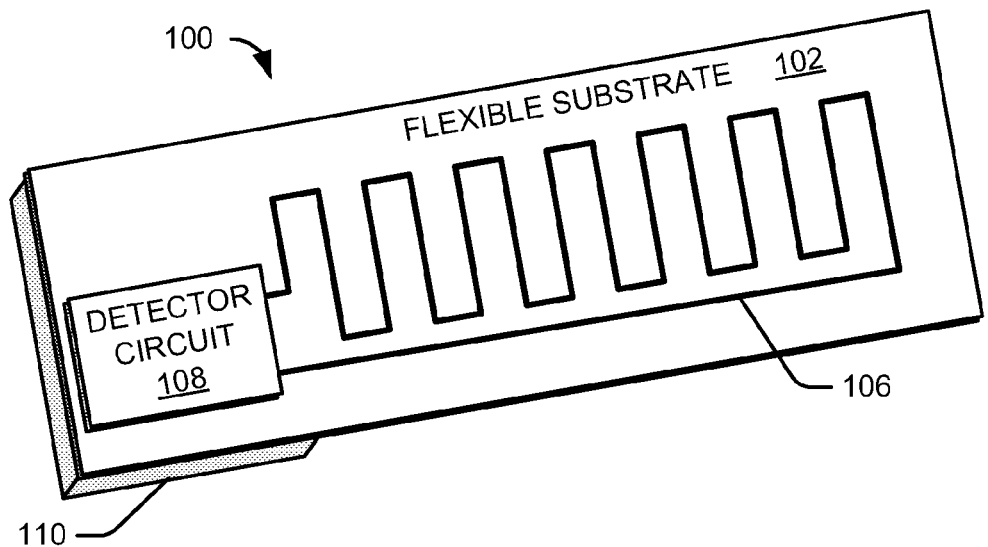
FIGS. 1A, 1B, and 1C are simplified diagrams illustrating sample aspects of a sensing device.

In accordance with common practice the various features illustrated in the drawings may not be drawn to scale. Accordingly, the dimensions of the various features may be arbitrarily expanded or reduced for clarity. In addition, some of the drawings may be simplified for clarity. Thus, the drawings may not depict all of the components of a given apparatus or method. Finally, like reference numerals may be used to denote like features throughout the specification and figures.

DETAILED DESCRIPTION

The description that follows sets forth one or more illustrative embodiments. It should be appreciated that the teachings herein may be embodied in a wide variety of forms, some of which may appear to be quite different from those of the disclosed embodiments. Consequently, the specific structural and functional details disclosed herein are merely representative and do not limit the scope of the disclosure. For example, based on the teachings herein one skilled in the art should appreciate that the various structural and functional details disclosed herein may be incorporated in an embodiment independently of any other structural or functional details. Thus, an apparatus may be implemented or a method practiced using any number of the structural or functional details set forth in any disclosed embodiment(s). Also, an apparatus may be implemented or a method practiced using other structural or functional details in addition to or other than the structural or functional details set forth in any disclosed embodiment(s).

Figure 1B:
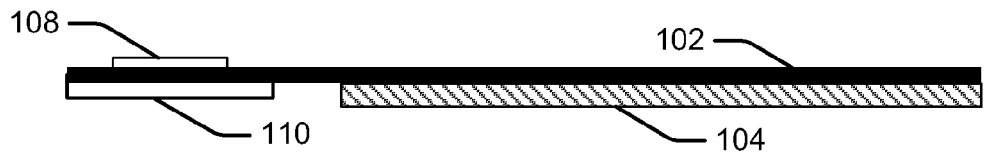
Figure 1C:
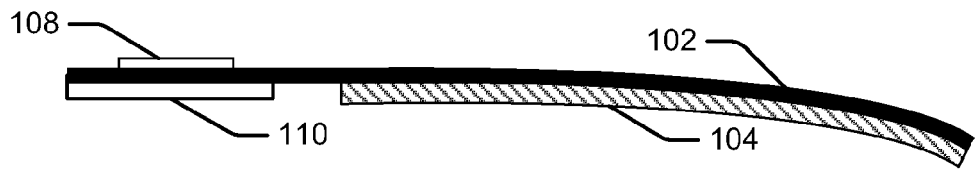

FIG. 1A is a simplified view of a sensing device 100 including a flexible substrate 102. As shown in the side views of FIGS. 1B and 1C, the flexible substrate 102 may be coupled to an object 104 (e.g., a machine or body part) whereby movement or deformation of the object 104 causes the flexible substrate 102 to be displaced (e.g., substrate flexion).

As illustrated in FIG. 1A, the flexible substrate 102 may include an electrical conductor 106 that is coupled to a detector circuit 108 (e.g., an application-specific integrated circuit). For purposes of illustration, only a single conductor 106 is shown in FIG. 1A. In practice, however, the flexible substrate 102 may include one or more conductors (e.g., as discussed below in conjunction with FIGS. 10A-10C).

As will be discussed in more detail below, the detector circuit 108 detects electrical changes to a circuit that includes the conductor 106 to determine the displacement of the flexible substrate 102. For example, angular displacement of the flexible substrate 102 may result in a change in one or more physical properties associated with the conductor 106. As a result of this change, the detector circuit 108 may detect a change in an electrical signal propagating through the conductor 106. The detector circuit 108 may thus determine the angular displacement based on this change in the electrical signal.

The detector circuit 108 may be coupled to the flexible substrate 102 in various ways. For example, as shown in FIG. 1A, the detector circuit 108 may be mounted on the flexible substrate 102. In this case, the device 100 may include a rigid member 110 (e.g., a circuit board comprising FR-4 material) that supports the detector circuit 108 (e.g., to prevent flexing of the portion of the flexible substrate 102 in the area around the detector circuit 108). Alternatively, the detector circuit 108 may be mounted on a different assembly than the flexible substrate 102, whereby an appropriate connection mechanism may be employed to couple the flexible substrate 102 with the detector circuit 108. In addition, as discussed below, in some implementations the detector circuit 108 may comprise multiple circuits that are coupled to the flexible substrate 102.

Sample operations relating to determining the angular displacement of a flexible substrate will now be described in more detail in conjunction with the flowchart of FIG. 2. For convenience, the operations of FIG. 2 (or any other operations discussed or taught herein) may be described as being performed by specific components (e.g., the components of the sensing device 100). It should be appreciated, however, that these operations may be performed by other types of components and may be performed using a different number of components. It also should be appreciated that one or more of the operations described herein may not be employed in a given implementation.

For illustration purposes, the disclosure that follows describes an example where an electrical change to a millimeter-wave (hereafter "mm-wave") circuit is detected to determine the angular displacement of a flexible substrate. It should be appreciated, however, that the teachings herein may apply to other types of circuits (e.g., operating within some other frequency band).

Figure 2:
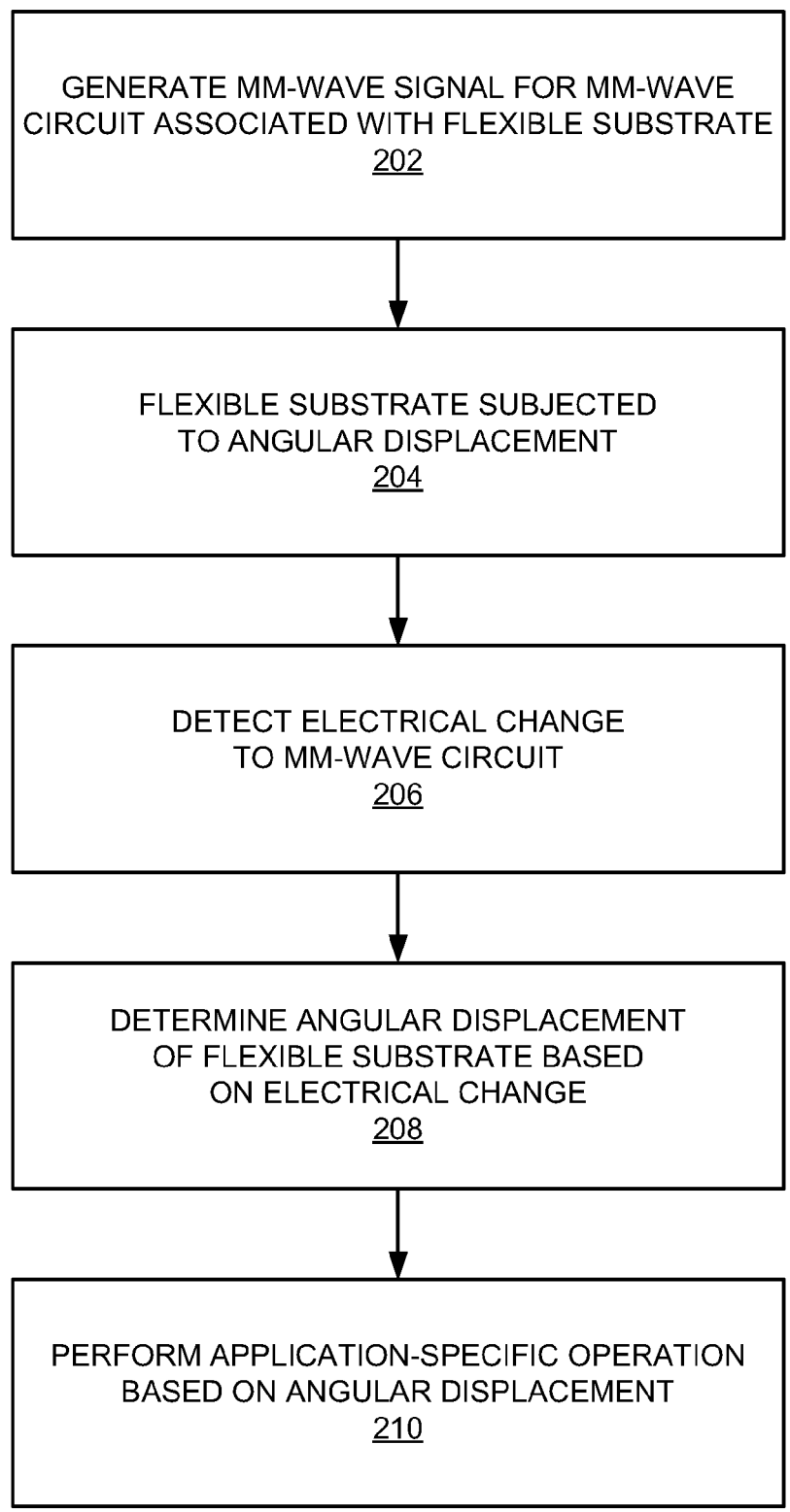
FIG. 2 is a flowchart illustrating sample operations that may be performed in conjunction with determining angular displacement of a flexible substrate.

As represented by block 202 of FIG. 2, the detector circuit 108 generates a mm-wave signal (i.e., in the range of 30-300 GHz) that is coupled to the conductor 106. Accordingly, the conductor 106 and a portion of the detector circuit 108 (e.g., a portion that interfaces with the conductor 106) collectively form a mm-wave circuit. In some aspects, a mm-wave circuit may be provided by application of a mm-wave signal to one or more electrical conductors. In some aspects a mm-wave circuit may be provided by an appropriate configuration of an electrical conductor. For example, a mm-wave circuit may comprise a waveguide (e.g., a stacked waveguide) configured to carry mm-wave signals.

The detector circuit 108 may provide various types of signals for the mm-wave circuit. For example, the detector circuit 108 may generate an oscillating signal, pulse signals, or some other suitable type of signal.

As represented by block 204, at some point in time the flexible substrate 102 is subjected to angular displacement. As an example, the flexible substrate 102 may comprise a portion of a glove-based controller for a video game system. In this case, certain movements of a user's hand (e.g., as represented by the bend in the object 104 in FIG. 1C) will cause the flexible substrate 102 to bend.

The displacement of the flexible substrate 102 may, in turn, affect one or more physical properties of the mm-wave circuit. For example, such a displacement may change the length of a transmission path for a signal passing through one or more conductors (e.g., the conductor 106). In some cases a change in the length of the transmission path may involve a change in the physical length of a conductor. In some cases a change in the length of the transmission path may involve a change in the length of an electrical path as opposed to the physical length of a conductor. For example, a change in path length may result from a change in the distance between sections of one or more electrical conductors. Here, the path of the signal may involve the signal being coupled across gaps between these sections of the conductors (e.g., through a dielectric material). Thus, displacement of the flexible substrate may result in a change in the width of these gaps and, hence, a change in the effective length of the transmission path.

In some implementations the displacement of a flexible substrate may change an electrical property of a substrate material. For example, a displacement may cause a change in the dielectric constant of a mechanically sensitive dielectric. This, in turn, may effect how a signal propagates through the flexible substrate. In some aspects, the displacement of a flexible substrate may induce a filtering characteristic change (e.g., corresponding to a change in phase and/or amplitude).

A brief example relating to the propagation of an electromagnetic wave through a transmission line will be described to further illustrate how displacement of the flexible substrate 102, resulting in a change in length of a transmission line, may affect a physical property of a mm-wave circuit. It should be appreciated that the teachings herein are not limited to the specific example of changing the length of a transmission line. Rather, this example is provided to illustrate how the teachings herein may be particularly effective at certain operating frequencies (e.g., the mm-wave range). The equation for a propagating electromagnetic wave is set forth in Equation 1:

$$y = A\cos(kx - \omega t) \text{ where } k = \omega\frac{\sqrt{e_r}}{c}, \qquad \text{EQUATION 1}$$

A corresponds to the amplitude of the signal,
x is the distance along the transmission line,
ω is the frequency,
t is time,
$e_r$ is the relative dielectric constant of the transmission line, and
c is the speed of light.

Assuming $e_r$ is 4, with an operating frequency of 5 GHz, a change in length of 3.75 mm causes a π/4 phase shift. However, at 50 GHz, a change in length of only 0.375 mm causes a π/4 phase shift. Hence, when operating in the mm-wave range, certain ranges of displacement of a flexible substrate (e.g., that affect the length of a transmission line or electrical path) may be readily detected using the techniques taught herein.

As represented by block 206, the detector circuit 108 monitors the mm-wave circuit (e.g., continually or during certain time periods) to determine whether there has been an electrical change to the mm-wave circuit as a result of the displacement of the flexible substrate 102. Such an electrical change may take various forms. For example, the displacement of the flexible substrate 102 may cause a shift in phase, amplitude, frequency, pulse timing or shape, or some other characteristic of a mm-wave signal that propagates through the mm-wave circuit (e.g., the electrical conductor 106). In some cases, several characteristics (e.g., amplitude and phase) of the mm-wave signal may be concurrently affected by the displacement of the flexible substrate.

As represented by block 208, the detector circuit 108 determines the angular displacement of the flexible substrate 102 based on the electrical change detected at block 206. For example, a given change in an electrical parameter may be mapped (e.g., via a formula or table) with a given angular displacement. Accordingly, the detector circuit 108 may generate a corresponding indication of angular displacement that may be stored in the detector circuit 108 (e.g., in a memory device) and/or provided to another component.

Figure 3:
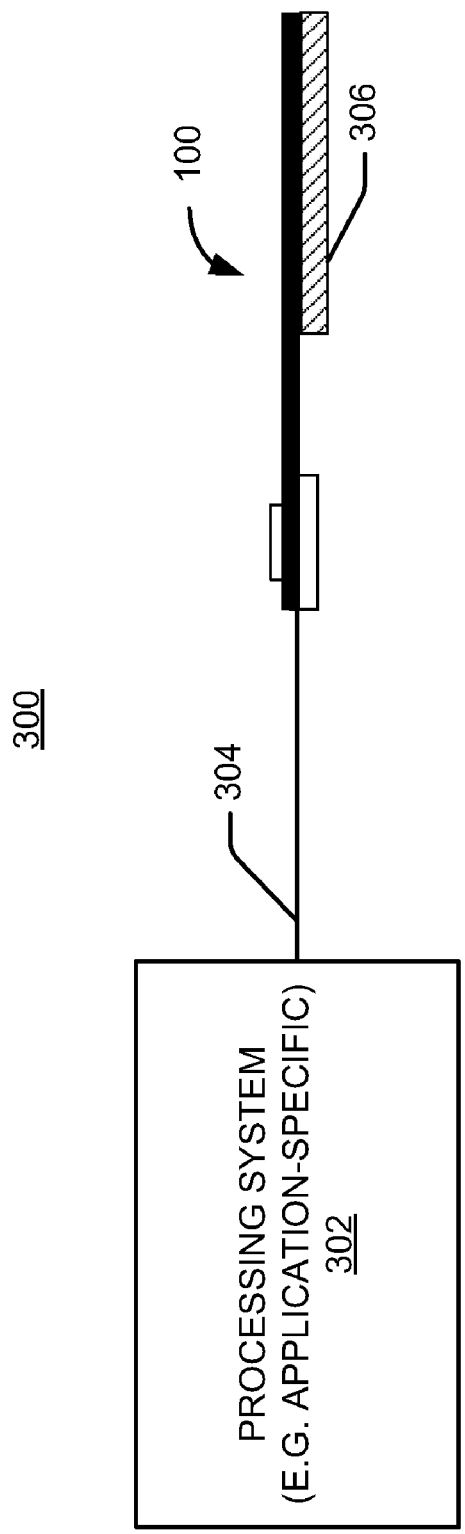
FIG. 3 is a simplified diagram illustrating sample aspects of a system that performs operations based on angular displacement of a flexible substrate.

As represented by block 210, the angular displacement information provided by the detector circuit 108 may be used for one or more designated applications. For example, in the system 300 depicted in FIG. 3, a processing system 302 (e.g., an application-specific processing system) is coupled to the sensing device 100 (e.g., a stand-alone sensor) via a communication link 304 (e.g., an electrical, optical or wireless link). In this way, the processing system 302 may perform various operations in response to any angular displacement of the flexible substrate 102. Several examples of such operations follow.

In some implementations the system 300 may comprise a video game system, a virtual reality system, or some other type of computing system. In this case, the sensing device may 100 comprise, for example, a controller or some other form of user interface device. Such a device may be incorporated into, for example, an apparatus (as represented by the object 306 of FIG. 3) that is worn by a user (e.g., a glove or headgear), an apparatus that is held by a user (e.g., a flexible controller device), or an apparatus that takes some other suitable form to capture certain body movements (e.g., arm, hand, and finger movements). In response to the sensed angular displacement, the processing system 302 may perform an operation such as, for example, providing an output indication (e.g., a visual, audible, or vibratory output).

In some implementations the system 300 may comprise a fault detection system (e.g., a wireless sensor network). In this case, the sensing device 100 may comprise, for example, a sensor that is coupled with (e.g., attached to) an object (e.g., a mechanical part as represented by the object 306 of FIG. 3) that may potentially fail due to mechanical strain. Here, the system 300 may generate an indication of fault or potential fault in the event the sensing device 100 detects one or more angular displacements (e.g., of a certain magnitude or magnitudes) that correspond to a certain level of mechanical strain on the object.

In some implementations the system 300 may comprise a biomechanical system (e.g., used for body sensing, biomedical rehabilitation, active sports equipment, mesh suits, and so on). Here, the sensing device 100 may comprise, for example, a sensor that is fitted to (e.g., worn on) a body part (as represented by the object 306 of FIG. 3). The system 300 may thus track certain movements (e.g., ranges of motion) of the person. Such information may be used in the case of rehabilitation, for example, to determine how the person's physical therapy is progressing.

In some implementations the system 300 may comprise a robotic system or some other type of system that employs mechanical sensing. Here, the sensing device 100 may comprise, for example, a sensor that is coupled with (e.g., attached to) a moving part (as represented by the object 306 of FIG. 3) of the robotic system. The system 300 may thus track certain movements (e.g., angular motion) of that part (e.g., to provide feedback to a motion controller).

With the above overview in mind, additional details relating to sample implementations of various components of a sensing device will now be treated in conjunction with FIGS. 4-14C. In some aspects, FIGS. 4-9 relate to various implementations of a circuit (e.g., similar to the detector circuit 108 discussed above) that may be used to provide signals for and/or sense signals of a mm-wave circuit. In some aspects, FIGS. 10A-14C relate to various implementations of a flexible substrate (e.g., similar to the flexible substrate 102 discussed above).

Figure 4:
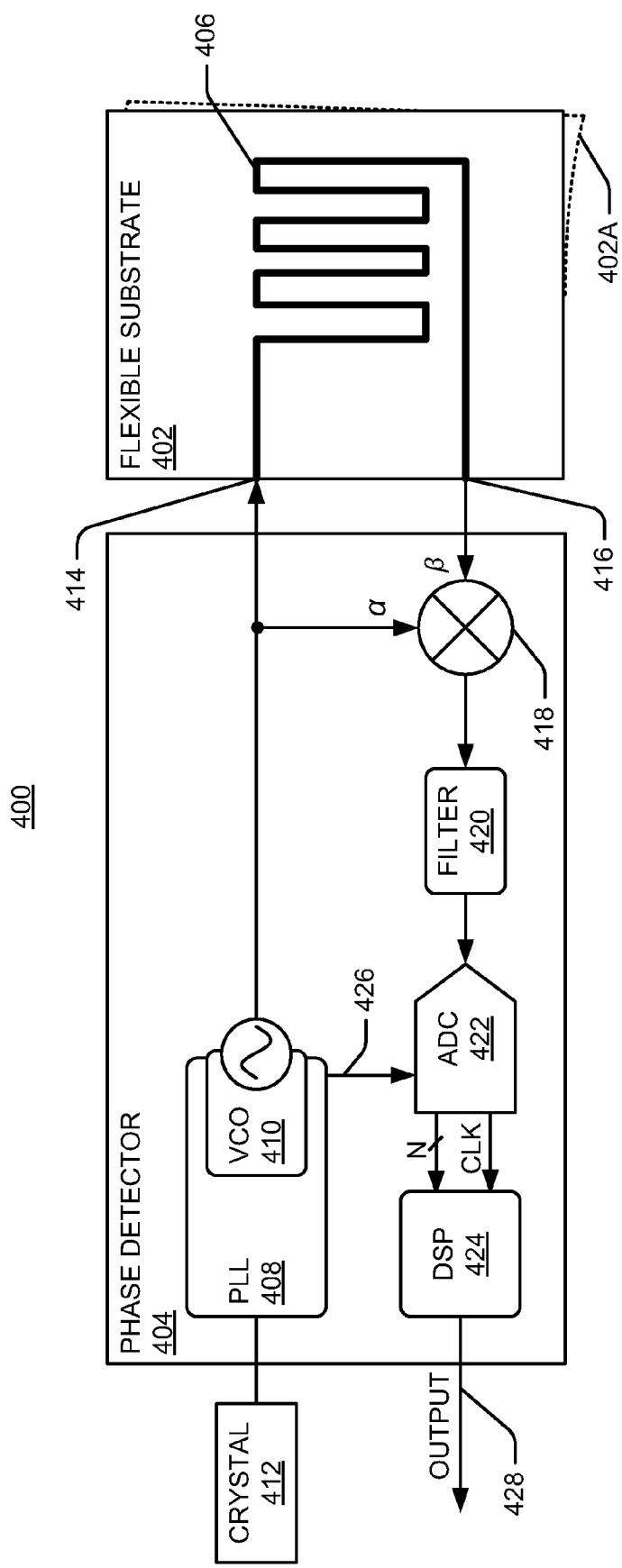
FIG. 4 is a simplified diagram illustrating sample aspects of a sensing device employing phase shift detection.

Referring initially to FIG. 4, a sensor 400 includes a flexible substrate 402 and a phase detector 404. In this example, the phase detector 404 detects a phase shift of a signal of a mm-wave circuit that results from the displacement of the flexible substrate 402. Here, a potential displacement of the flexible substrate 402 is represented by a dashed line 402A.

The phase detector 404 includes a signal generator that provides a mm-wave signal for a mm-wave circuit. Specifically, the signal generator includes a locked loop circuit such as a phase locked loop 408 (including a voltage controlled oscillator 410) that is driven by a crystal 412. The locked loop circuit may instead comprise a delay locked loop.

The output of the phase locked loop 408 is coupled to a terminal 414 of the flexible substrate 402. The mm-wave signal thus propagates from the terminal 414 through the conductor 406 to another terminal 416 of the flexible substrate 402.

The phase detector 404 includes a signal processing circuit that processes the mm-wave signal received via the terminal 416. This circuit includes a mixer 418, a filter 420 (e.g., a low pass filter), an analog-to-digital converter 422, and a digital signal processor 424.

In this example, the mm-wave circuit thus comprises the conductor 406, material (e.g., dielectric) surrounding the conductor 406, the terminals 414 and 416, as well as the output circuitry of the signal generator and the input circuitry of the signal processing circuit (e.g., including signal conduction paths). Hence, displacement of the flexible substrate 402 may affect the electrical characteristics of the mm-wave circuit which, in turn, may affect one or more characteristics of the mm-wave signal received by the signal processing circuit.

The signal processing circuit is configured to detect such a change in the mm-wave signal by comparing the mm-wave signal at the terminal 414 (represented by the symbol $\alpha$) with the mm-wave signal at the terminal 416 (represented by the symbol $\beta$). For example, the signal processing circuit may detect a phase shift of a standing wave pattern of the mm-wave circuit. Here, the output of the phase locked loop 408 may be represented by a frequency f, whereby $\alpha = \cos(ft)$. As the flexible substrate 402 flexes, a phase shift is introduced to $\beta = \cos(ft+\Phi)$. The mixer 418 outputs signal components including a signal representative of the phase shift $\Phi$. The output of the mixer 418 is filtered by the filter 420 to extract the signal component including the phase shift information. The analog-to-digital converter 422 uses a sampling clock CLK (e.g., comprising or derived from a signal 426 received from the phase locked loop 408) to convert the filtered signal to a digital signal. As shown in FIG. 4, the digital signal (e.g., consisting of "N" bits per sample) and the sampling clock CLK are provided to the digital signal processor 424. The digital signal processor 424 processes this digital signal to provide an indication 428 relating to the displacement of the flexible substrate 402.

The processing performed by the digital signal processor 424 may take various forms. For example, in some implementations the digital signal processor 424 may acquire phase shift information over time to generate information such as the average phase shift, standard deviation of the phase shift, mean phase shift, or some other desired parameter or parameters. In this case, the digital signal processor 424 may output this information as the indication 428 and/or may use this information for subsequent processing operations.

In some implementations the digital signal processor 424 may generate information indicative of the actual displacement of the flexible substrate 402. For example, based on theoretical calculations and/or empirical measurements, a given change in phase may be associated with a given angular displacement. The digital signal processor 424 may thus use a formula, a table, or some other suitable technique to output an appropriate indication 428 (e.g., an estimate) of angular displacement based on the change in phase.

The components of FIG. 4 may be configured based on the one or more parameters specific to a given application. For example, the frequency f may be selected such that the maximum electrical phase change is observed per flexion angle. Here, different length transmission paths may be used for different applications (e.g., associated with different flexion angles). Thus, the frequency f may be selected to suit the particular transmission path structure of a given application. In some cases, an appropriate frequency may be identified by performing a frequency sweep test (and monitoring the output of the system) while controllably displacing the flexible substrate. Also, depending on the desired bandwidth of operation, the sampling clock CLK and the filter 420 may be adapted to support a corresponding Nyquist sampling frequency and bandwidth.

A sensing device constructed in the manner of the sensor 400 may provide an effective mechanism for determining (e.g., measuring) the angular displacement of a flexible substrate, without the performance constraints or relatively high cost of other sensing techniques (e.g., as discussed above). For example, the sensor 400 may provide relatively high performance sensing since the signal processing circuit may quickly and accurately detect any changes in phase that occur as a result of any relatively rapid displacement of the flexible substrate 402. Moreover, the sensor 400 may utilize relatively common and low cost signal processing components (e.g., that may be implemented using low power scalable CMOS) and a relatively low cost flexible substrate (e.g., that may be implemented using flex-tape technology).

Figure 5:
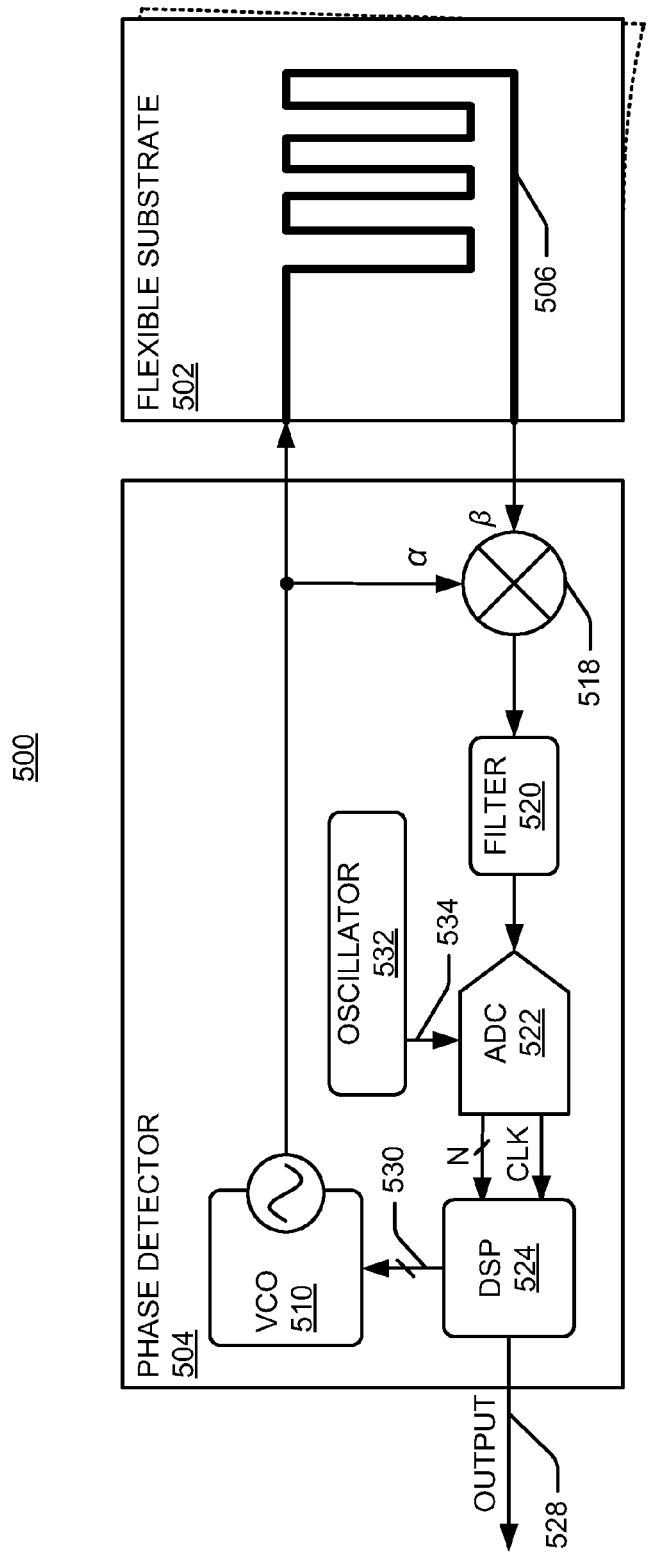
FIG. 5 is a simplified diagram illustrating sample aspects of another sensing device employing phase shift detection.

FIG. 5 illustrates an example of a sensor 500 including a phase detector 504 that does not use a locked loop circuit or an external crystal reference. Since a locked loop circuit is not employed here, the sensor 500 also may avoid the use of divider circuits that may consume a relatively large amount of power. Consequently, the sensor 500 may consume less power than the sensor 400 and be implemented at an even lower cost.

The phase detector 504 employs a signal generator consisting of a voltage controlled oscillator 510. In this case, the digital signal processor 524 may provide digital signals 530 that control the output frequency of the voltage controlled oscillator 510. Here, the output frequency may be set to maximize the phase shift detected by an associated signal processing circuit for a given displacement of the flexible substrate 502.

In this example, an oscillator 532 may provide a clock signal 534 for an analog-to-digital converter 522. In a similar manner as discussed above, the clock signal 534 may comprise a sampling clock CLK or may comprise a signal from which the sampling clock CLK is derived. Again as above, the sampling clock CLK may be provided to the digital signal processor 524 for synchronization purposes. In general, the construction and other operations of the components of FIG. 5 (e.g., components 502, 506, 510, 518, 520, 522, 524, and 528) may be similar to corresponding components of FIG. 4 (e.g., components 402, 406, 410, 418, 420, 422, 424, and 428).

In some aspects, due to the use of an open-loop mode of operation, the sensor 500 may be more sensitive to temperature drift than the sensor 400. However, relatively accurate sensing results may still be achieved even when there is some variation in the frequency of the mm-wave signal. Also, the operating frequency of the oscillator 532 need not be strictly controlled to achieve a desirable sensing accuracy. Hence, the oscillator 532 also may be operated in an open-loop mode. In summary, the architecture of the sensor 500 may be advantageously employed in applications where it is desirable to trade-off some level of accuracy for lower power consumption.

Figure 6:
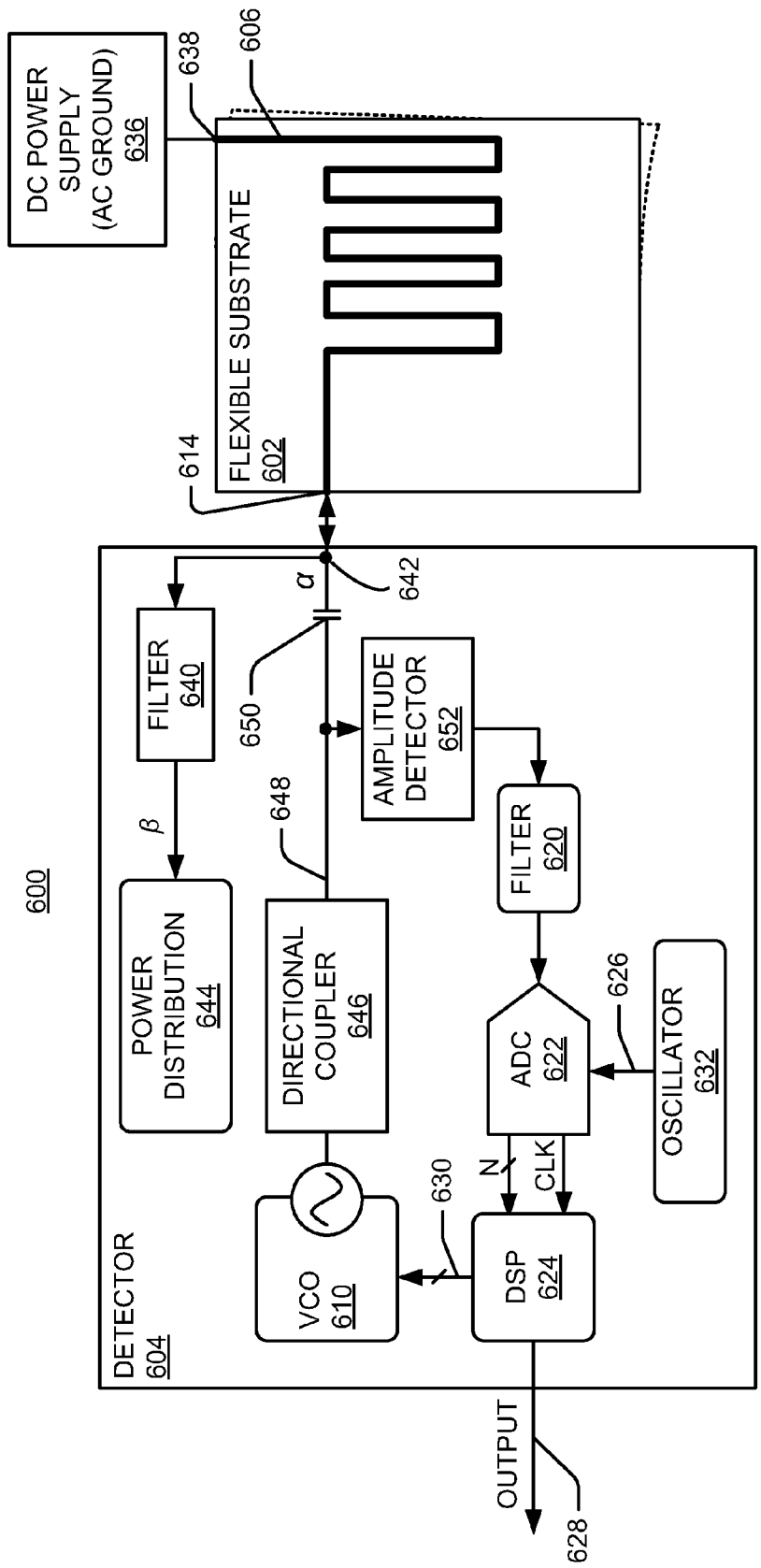
FIG. 6 is a simplified diagram illustrating sample aspects of a sensing device employing amplitude shift detection.

FIG. 6 depicts a sensor 600 than may have even lower cost and/or complexity in some aspects as compared to the above examples. In this example, one or more electrical conductors 606 of a flexible substrate 602 are also used to provide power to the components of the sensor 600. Specifically, a DC power supply 636 is coupled to a terminal 638 of the flexible substrate 602 whereby a power signal (e.g., a DC voltage) is provided to a detector 604 via another terminal 614 of the flexible substrate 602. As a result, the pin count on the detector 604 may be reduced due to power being provided via the flexible substrate 602. In addition, as a result of this power distribution scheme, the complexity of the wiring for detector 604 may be lower as compared to the above examples.

The detector 604 includes a filter 640 that is coupled to a signal path 642 to receive the power signal provided at the terminal 614. The filter 640 also is configured to filter out (e.g., attenuate or remove) any non-DC signals from the received signal. In particular, the filter 640 may be configured to filter out any mm-wave signals (as represented by α) that also may be present on the signal path 642. For example, the filter 640 may comprise an L-C tank circuit that is tuned to the same frequency as a voltage controlled oscillator 610 that generates the mm-wave signal. In this way, the majority of the mm-wave signals are directed back to the mm-wave circuit, instead of feeding into the detector components via the power supply path.

The filtered power signal (e.g., a DC voltage represented by β) is provided to a power distribution circuit 644 that distributes power to the components of the detector 604. For example, various signal paths or power planes (not shown) may provide power to signal generator and signal processing circuit components described below.

The detector 604 includes a signal generator consisting of a voltage controlled oscillator 610 that generates a mm-wave signal (e.g., as controlled by signals 630 from a digital signal processor 624). In other implementations, the signal generator may instead incorporate a crystal and phase locked loop as in FIG. 4 to provide better immunity to temperature variations.

A directional coupler 646 buffers the mm-wave signal to provide the signal on a signal path 648 whereby the signal is AC coupled via a capacitor 650 to the signal path 642. The mm-wave signal travels from the signal path 642 to the terminal 614 and then along the conductor(s) 606 to an AC ground at the DC power supply 636. Thus, in this example, the signal paths 648 and 642 and the conductor(s) 606 each form part of the mm-wave circuit. The directional coupler 646 is employed to prevent any signals on the signal path 648 from feeding back to the output of the voltage controlled oscillator 610. In addition, the capacitor 650 is employed to prevent the DC signal on signal path 642 from coupling to the signal path 648 while allowing mm-wave signals to pass between these signal paths.

In the example of FIG. 6, the signal processing circuit is configured to detect a shift in the amplitude of a mm-wave signal for the mm-wave circuit. For example, the effective impedance of the mm-wave circuit may change when the flexible substrate 602 is displaced. As a result, there may a change in the magnitude of the signal at the signal path 648 (e.g., the signal launch point).

An amplitude detector 652 (e.g., a peak detector) detects this amplitude shift and outputs signal components including a signal component representative of the amplitude shift. The output of the amplitude detector 652 is filtered by a filter 620 (e.g., a low pass filter) to extract the signal component including the amplitude shift information. An analog-to-digital converter 622 uses a sampling clock CLK (e.g., comprising or derived from a signal 626 received from an oscillator 632) to convert the filtered signal to a digital signal. In a similar manner as discussed above, the digital signal consisting of "N" bits per sample and the sampling clock CLK are provided to a digital signal processor 624.

The digital signal processor 624 processes the digital signal to provide an indication 628 relating to the displacement of the flexible substrate 602. For example, the digital signal processor 624 may acquire amplitude shift information over time to generate information such as the average amplitude shift, standard deviation of the amplitude shift, mean amplitude shift, or some other desired parameter or parameters. In a similar manner as discussed above, the digital signal processor 624 may output this amplitude information as the indication 628 and/or may use this amplitude information for subsequent processing operations (e.g., to provide an estimate of the actual displacement of the flexible substrate 602).

Figure 7:
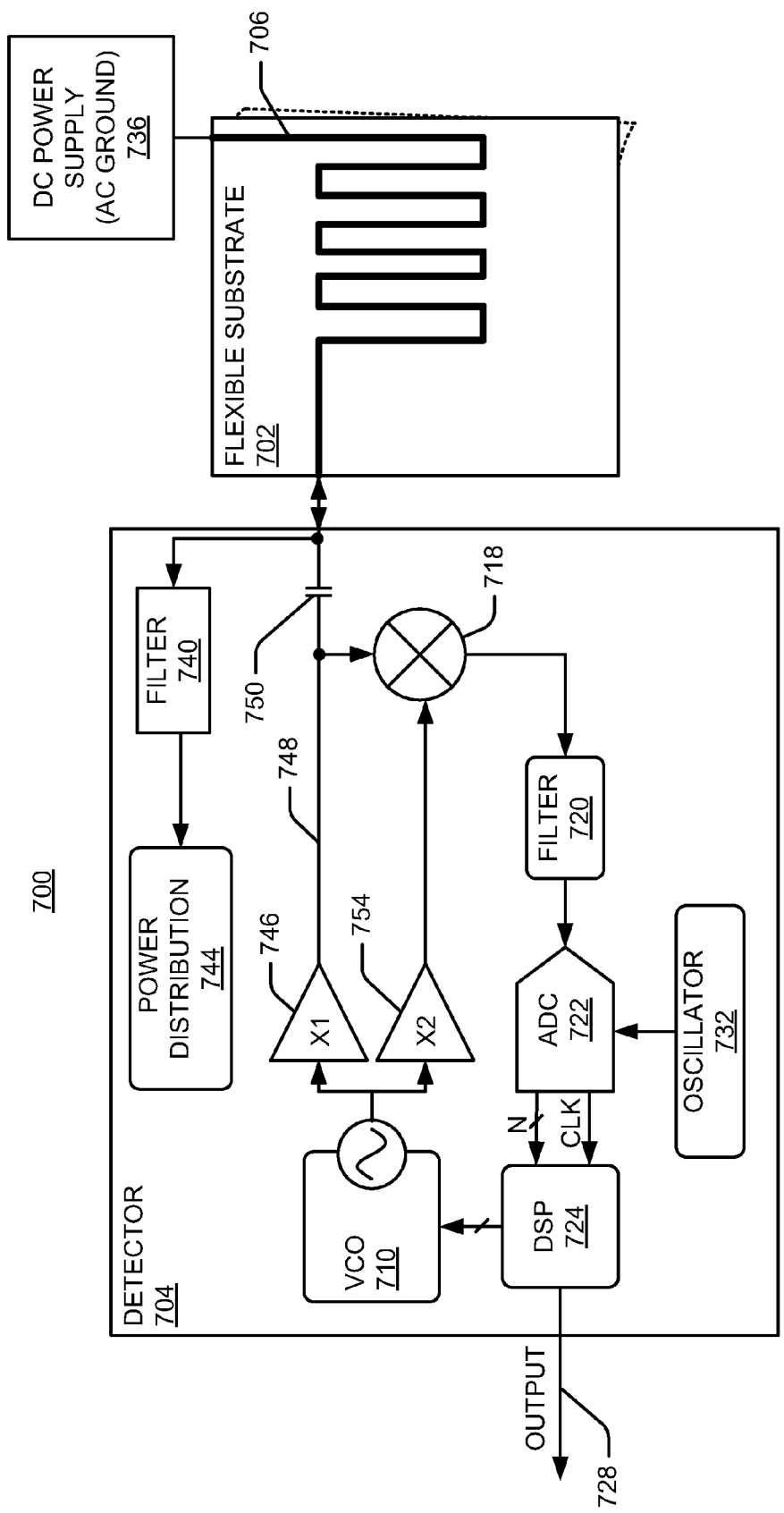
FIG. 7 is a simplified diagram illustrating sample aspects of a sensing device employing phase and amplitude shift detection.

As mentioned above, a sensing device may detect more than one electrical change to a mm-wave circuit to determine the displacement of a flexible substrate. For example, FIG. 7 illustrates an example of a sensor 700 where a detector 704 may detect both phase and amplitude shifts that result from displacement of a flexible substrate 702. In general, the operations of the components of FIG. 7 (e.g., components 702, 706, 710, 720, 722, 724, 728, 732, 736, 740, 744, 746, and 750) may be similar to corresponding components of FIG. 6 (e.g., components 602, 606, 610, 620, 622, 624, 628, 632, 636, 640, 644, 646, and 650, respectively). However, in this case, the signal processing circuit employs a mixer 718 (instead of an amplitude detector 652) and an associated directional coupler 754 (e.g., a buffer) for detecting both phase and amplitude shifts of a mm-wave signal of a mm-wave circuit.

As mentioned above in conjunction with FIG. 6, displacement of the flexible substrate may result in a shift in the amplitude of a mm-wave signal at signal path 748 due to a change in the electrical properties of the flexible substrate 702. Moreover, this change in the electrical properties also may result in a shift in the phase of the mm-wave signal at signal path 748. Accordingly, the mixer 718 may combine the signal from the signal path 748 with a reference signal from the directional coupler 754 that corresponds to the original waveform supplied to the mm-wave circuit. The resulting signal output by the mixer 718 will contain signal components relating to the amplitude differences between the two mixer input signals and the phase differences between the two mixer input signals. Thus, phase shift information may be obtained in a similar manner as in FIG. 4 (i.e., from a product term involving $\Phi$). In addition, amplitude information may be obtained from a product term relating to the amplitudes of the two mixer input signals.

This information may then be processed by the filter 720, the analog-to-digital converter 722, and the digital signal processor 724 to provide one or more indications relating to the angular displacement of the flexible substrate 702. That is, as discussed above, the digital signal processor 724 may generate an indication of one or more of the detected phase shift, the detected amplitude shift, or the estimated angular displacement.

Figure 8:
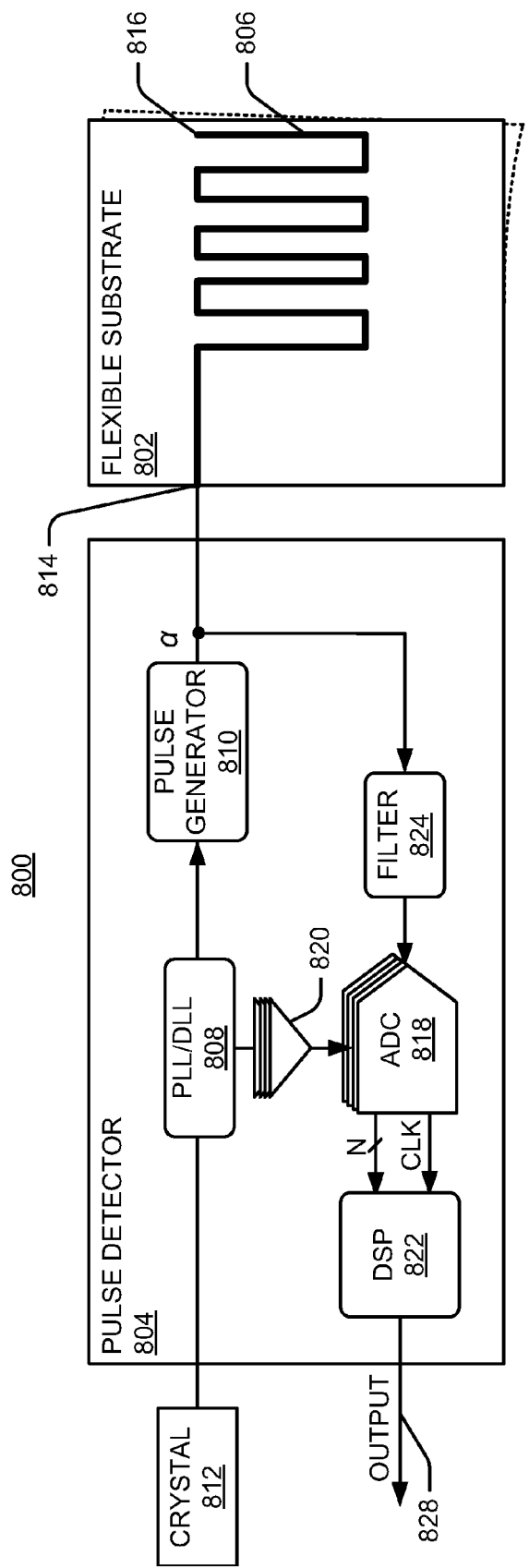
FIG. 8 is a simplified diagram illustrating sample aspects of a sensing device employing pulse detection.
Figure 9:
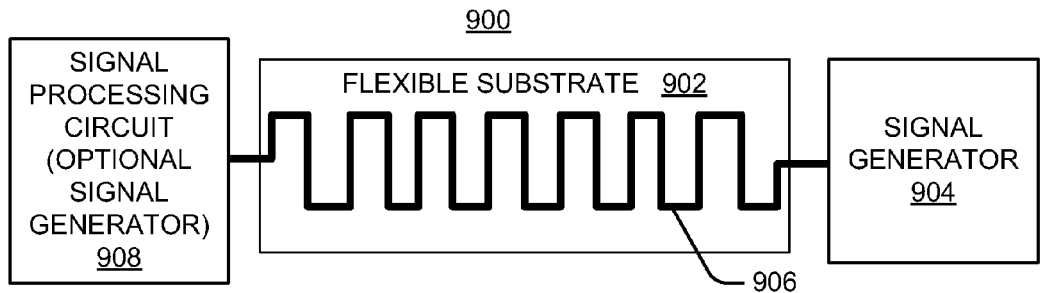
FIG. 9 is a simplified diagram illustrating sample aspects of a sensing device employing circuits coupled to multiple ends of a flexible substrate.

Referring now to FIG. 8, in some implementations a time domain reflectometry-type of technique may be employed to determine the displacement of a flexible substrate 802. For example, a signal generator of a pulse detector 804 may provide pulses to an electrical conductor 806 of the flexible substrate 802 whereby a signal processing circuit of the pulse detector 804 detects a pulse shift (e.g., a change in the timing and/or shape of the reflected pulses) that results from the displacement of the flexible substrate 802.

The signal generator of the pulse detector 804 includes a phase locked loop or delay locked loop (hereafter "PLL/DLL") 808 that generates signals to trigger a pulse generator 810. As shown in FIG. 8, the PLL/DLL 808 may be driven by a crystal 812. The PLL/DLL 808 may operate at a pulse-repetition frequency that is related to how quickly the sensor 800 is to detect displacement of the flexible substrate 802. That is, a higher pulse-repetition frequency reflects a higher detection bandwidth while a lower pulse-repetition frequency reflects a lower detection bandwidth.

The pulse generator 810 generates pulses that are provided to a terminal 814 of the flexible substrate. The pulses travel down the conductor 806, are reflected at an endpoint 816 of the conductor 806, and reflected back through the conductor 806 to the terminal 814.

In the event the flexible substrate 802 has been subjected to angular displacement, the electrical characteristics of this signal path (e.g., a mm-wave circuit) may change, thereby effecting one or more characteristics of the reflected pulse signals. Accordingly, the signal processing circuit of the pulse detector 804 may be configured to detect an electrical change in the circuit such as a change in the timing of reflected pulses (e.g., a pulse position shift) and/or a change in the shape of reflected pulses.

The signal processing circuit of FIG. 8 includes a filter 824 (e.g., a low pass filter) that filters all of the signals at the output stage of the pulse detector 804 (as represented by a). The resulting filtered signals are provided to an analog-to-digital converter 818. Here, the PLL/DLL 808 is configured to enable the analog-to-digital converter 818 at the appropriate times so that the analog-to-digital converter 818 will sample the reflected pulses (and optionally the transmitted pulses). The pulse detector 804 may employ a buffer 820 that delays at least a portion of the signals from the PLL/DLL 808 to provide the desired sample timing.

The digital signal processor 822 processes the digital signals from the analog-to-digital converter 818 to provide an indication 828 relating to the displacement of the flexible substrate 802. For example, the digital signal processor 822 may compare the timing between transmitted and received pulses over time to determine whether this inter-pulse timing has changed. Alternatively or in addition, the digital signal processor 822 may compare the pulse shape information (e.g., as represented by an integration or some other function applied to the pulse signals) of received pulses over time to determine whether this shape information has changed. In a similar manner as discussed above, the digital signal processor 822 may acquire pulse shift information over time to generate information such as the average pulse shift, standard deviation of the pulse shift, mean pulse shift, or some other desired parameter or parameters. Also similar to the above, the digital signal processor 822 may output this pulse shift information as the indication 828 and/or may use this information for subsequent processing operations (e.g., to provide an estimate of the actual displacement of the flexible substrate 802).

The digital signal information generated by the analog-to-digital converter 818 may be buffered and provided at a relatively low frequency to the digital signal processor 822 for processing. In addition, all of the closed loops of the pulse detector 804 may be operated at relative low frequencies. Accordingly, a sensing device constructed according to the teachings of FIG. 8 may be implemented as a relatively low power device.

As mentioned above, in some implementations the detector components may be coupled to different ends of a flexible substrate. For example, as depicted for a sensor 900 of FIG. 9, a signal generator 904 may be coupled to one end of a flexible substrate 902 while a signal processing circuit 908 is coupled to another end of the flexible substrate. In this case, the signal processing circuit 908 may determine an angular displacement of the flexible substrate based on a resulting electrical change in a signal sent by the signal generator 904 over one or more conductors 906 to the signal processing circuit 908. Such an implementation may be used, for example, for applications where the flexible substrate 902 is prohibitively long, thereby making it undesirable to send a signal across the flexible substrate 902 and back.

In various implementations, the signal provided by the signal generator 904 may originate at either end of the flexible substrate 902. For example, in some implementations the signal generator 904 may comprise a phase locked loop or a voltage controlled oscillator as described herein that generates the original signal that is sent over the conductor(s) 906. Alternatively, in some implementations the signal processing circuit 908 may be co-located with a signal generator (e.g., as discussed above at FIGS. 4-8) that may comprise a phase locked loop or a voltage controlled oscillator that generates the original signal. In this case, the original signal may first be sent over a portion of the conductors 906 to the signal generator 904 that consists of, for example, an amplifier (e.g., a buffer) or some other suitable component that is configured to retransmit the received signal back over another portion of the conductors 906 to the signal processing circuit 908.

Referring now to FIGS. 10A-14C, several aspects of sample implementations of flexible substrates will be treated. In particular, FIGS. 10A-10C relate to an implementation that employs layered conductors, FIGS. 11A-13 relate to implementations that employ multiple flexible components, and FIGS. 14A-14C relate to an implementation that employs a foldable structure.

Figure 10A:
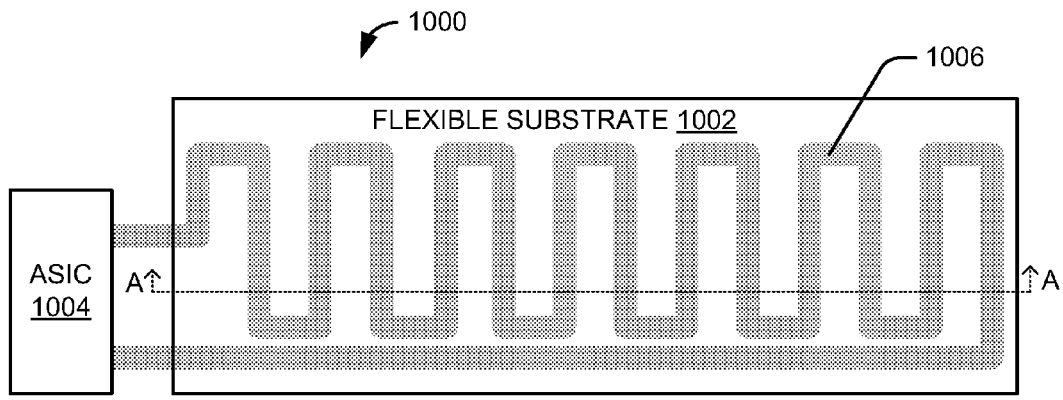
FIGS. 10A, 10B, and 10C are simplified diagrams illustrating sample aspects of a flexible substrate including multiple conductors.

FIG. 10A illustrates a top view of a sensor 1000 including a flexible substrate 1002 coupled to an ASIC 1004 (e.g., configured to provide detection operations as described herein). As shown in the sectional side views (from the perspective of view A-A of FIG. 10A) of FIGS. 10B and 10C, the flexible substrate 1002 includes a conductor 1006A on one layer 1002A and a conductor 1006B on another layer 1002B. For example, the conductor 1006A may comprise a transmission line as discussed above and the conductor 1006B may comprise a ground conductor (e.g., a slotted ground plane) or another transmission line (e.g., carrying a signal that is out of phase with the signal on the conductor 1006A). Here, it should be appreciated that the shaded blocks shown for each layer 1002A and 1002B of FIGS. 10B and 10C may be part of a common conductor for that layer (e.g., as shown in FIG. 10A).

Figure 10B:
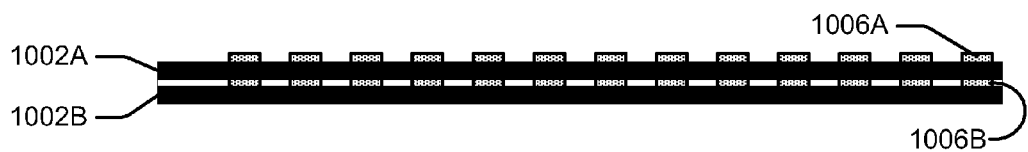

FIG. 10B illustrates that when the flexible substrate 1002 is relatively flat, the edges of corresponding portions of the conductors 1006A and 1006B (e.g., corresponding to the segments that appear as vertical lines in FIG. 10A) are substantially aligned. Hence, there is a certain spacing relationship between these conductor portions that results in the corresponding electrical circuit (e.g., a mm-wave circuit) having certain electrical properties.

Figure 10C:
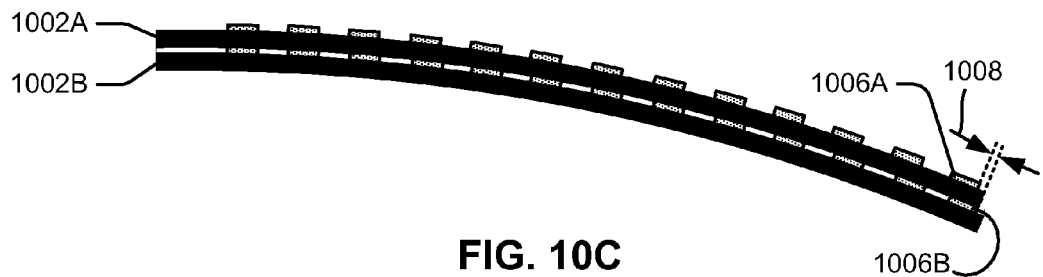

However, when the flexible substrate 1002 is subjected to angular displacement, the flexible substrate 1002 may become distorted as shown in FIG. 10C. That is, some portions (e.g., layers) of the substrate 1002 may be subjected to more angular displacement than other portions of the flexible substrate 1002. As a result, the edges of corresponding portions of the conductors 1006A and 1006B may no longer be substantially aligned as indicated by the spacing 1008. Consequently, there may be a different (e.g., larger) spacing between the conductor portions with the result that the corresponding electrical circuit (e.g., a mm-wave circuit) of FIG. 10C may have different electrical properties than the electrical circuit of FIG. 10B. For example, one effect of the "sliding" of the ground plane 1006B may be that the characteristic impedance of the signal transmission path changes.

Based on these variations of electrical properties resulting from angular displacement of the flexible substrate 1002, the ASIC 1004 may employ the signal detection techniques taught herein to determine the current angular displacement of the flexible substrate. Here, through the use of a flexible substrate that employs the above configuration, the ASIC 1004 may provide more sensitive and accurate angular displacement detection due to the interactions between the respective conductor portions of the different layers. For example, for a given angular displacement, there may be a larger electrical change in a circuit (e.g., a mm-wave circuit) provided in this type of flexible substrate as compared to, for example, a flexible substrate that only employs a single layer construction.

Layered conductors may be incorporated into a flexible substrate in various ways. For example, in some implementations a flexible substrate may utilize more than two conductor layers. In addition, a flexible substrate may be constructed of a material that provides specific distortion characteristics (e.g., conductor displacement versus angular displacement) to thereby provide a desired level of sensitivity and accuracy for detection of angular displacement. In some implementations the layered conductors may be implemented as distinct components that slide relative to one another (thereby achieving a similar result as above). In these cases, the components may be coupled together by a guide, a carrier, or some other mechanical coupler.

FIGS. 11A-13 illustrate several examples of flexible substrates that comprise subcomponents (e.g., flexible substrates in and of themselves). For example, as shown by the top view of FIG. 11A, a flexible substrate 1100 (e.g., a substrate subassembly) consists of a subcomponent 1102 and a subcomponent 1104.

Figure 11A:
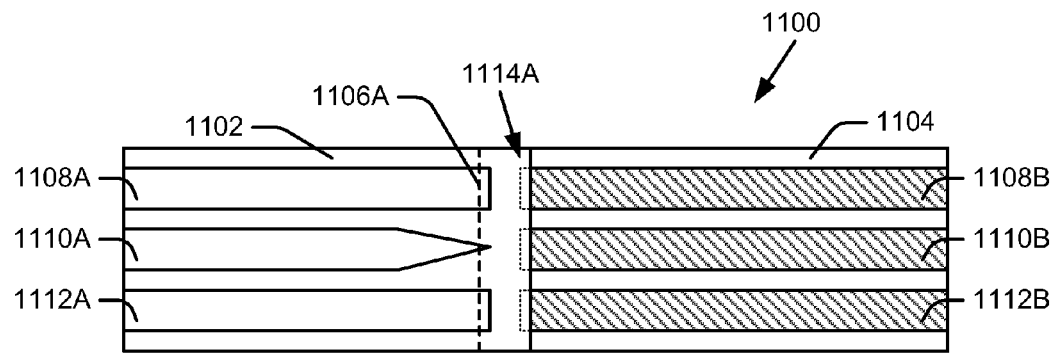
FIGS. 11A, 11B, 11C, and 11D are simplified diagrams illustrating sample aspects of another flexible substrate including multiple conductors.
Figure 11B:

The side view of FIG. 11B illustrates that an end portion of the subcomponent 1102 lies on top of an end portion of the subcomponent 1104. The leftmost end of the subcomponent 1104 underneath the subcomponent 1102 is illustrated by a dashed line 1106A in FIG. 11A.

Each subcomponent 1102 or 1004 of the flexible substrate 1100 may include one or more electrical conductors. For example, the subcomponent 1102 includes conductors 1108A, 1110A, and 1112A while the subcomponent 1104 includes conductors 1108B, 1110B, and 1112B. Here, the conductors 1110A and 1110B may comprise a transmission line for a signal while the conductors 1108A, 1112A, 1108B, and 1112B may comprise ground conductors. The dashed lines 1114A illustrate that end portions of the conductors 1108B, 1110B, and 1112B lie underneath an end portion of the subcomponent 1102. Here, it may be observed that in the configuration of FIGS. 11A and 11B, the conductors of one subcomponent may not overlap the conductors of the other subcomponent. Thus in this case, there may be little, if any, conduction of signals (e.g., mm-wave signals) between the conductors of the different subcomponents (e.g., between conductors 1108A and 1108B, between conductors 1110A and 1110B, and so on).

As will be discussed in more detail below, the subcomponents 1102 and 1104 are coupled together in a manner that enables these subcomponents to slide relative to one another when the flexible substrate 1100 is subjected to angular displacement. For example, when the flexible substrate 1100 is oriented to a flatter shape as shown in FIG. 11D, the end of each subcomponent 1102 or 1104 may slide toward the other subcomponent. Thus, in this case, the end portions of the subcomponents 1102 and 1104 overlap to a greater extent as shown in FIG. 11D and as indicated by the dashed line 1106B in FIG. 11C.

Figure 11C:
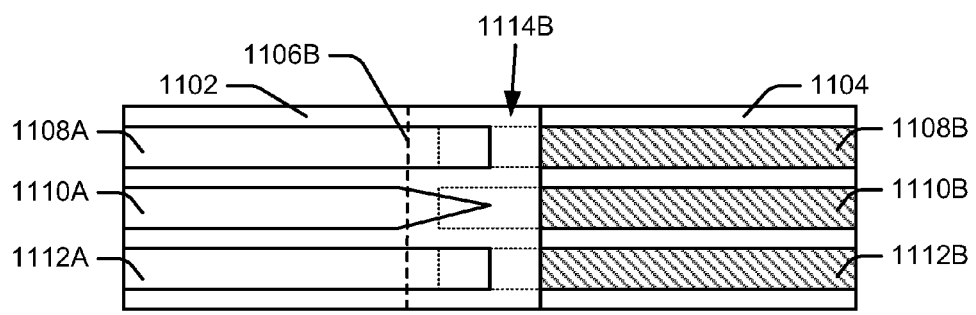
Figure 11D:

As illustrated by the dashed lines 1114B in FIG. 11C, the end portions of the conductors 1108B, 1110B, and 1112B now lie underneath the end portions of the conductors 1108A, 1110A, and 1112A, respectively. Hence, in this case there may be better signal coupling between the conductors of the different subcomponents (e.g., between conductors 1108A and 1108B, between conductors 1110A and 1110B, and so on).

From the above, it should be appreciated that the extent of the change in conductor overlap may depend on the extent to which the flexible substrate 1100 is displaced. In addition, the corresponding change in the spacing between the conductors of the different subcomponents and/or the corresponding change in the length of the overall transmission path formed by the conductors may result in a change in the electrical properties of an electrical circuit (e.g., a mm-wave circuit) including these conductors. Thus, a detector (not shown) may employ the signal detection techniques taught herein to determine the current angular displacement of the flexible substrate 1100 based on these changed electrical properties. Advantageously, through the use of a sliding and overlapping flexible substrate as described above, displacement detection may be achieved with a relatively high degree of sensitivity using a relatively small flexible substrate. Such a flexible substrate may be employed, for example, in wearable, bending applications such as glove-based sensors.

In some aspects, the conductors of a flexible substrate may be configured to facilitate detecting displacement of the flexible substrate. For example, as shown in FIGS. 11A and 11C, the conductor 1110A may have a tapered end. This shape may thus provide different (e.g., more gradual) changes in electrical characteristics for the circuit when the ends of the conductors 1110A and 1110B approach one another as compared to, for example, a case where the conductor 1110A instead has a squared-off end.

FIGS. 12A-12D illustrate a flexible substrate 1200 employing conductors (e.g., waveguides) having irregular shapes. In a similar manner as in FIGS. 11A-11D, the flexible substrate 1200 consists of a flexible subcomponent 1202 and a flexible subcomponent 1204. The flexible subcomponent 1202 includes conductors 1208A, 1210A, and 1212A while the flexible subcomponent 1204 includes conductors 1208B, 1210B, and 1212B. Here, the conductors 1210A and 1210B (e.g., the signal conductors) have irregular shapes at respective portions 1216A and 1216B.

Figure 12A:
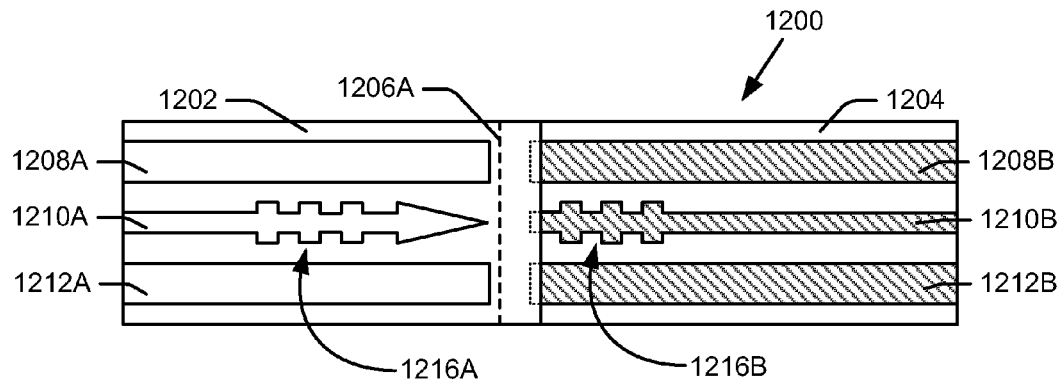
FIGS. 12A, 12B, 12C, and 12D are simplified diagrams illustrating sample aspects of another flexible substrate including multiple conductors.
Figure 12B:
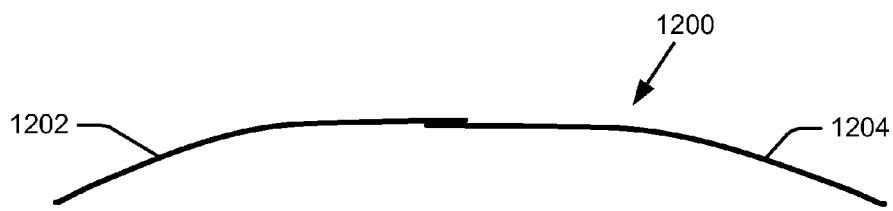
Figure 12C:
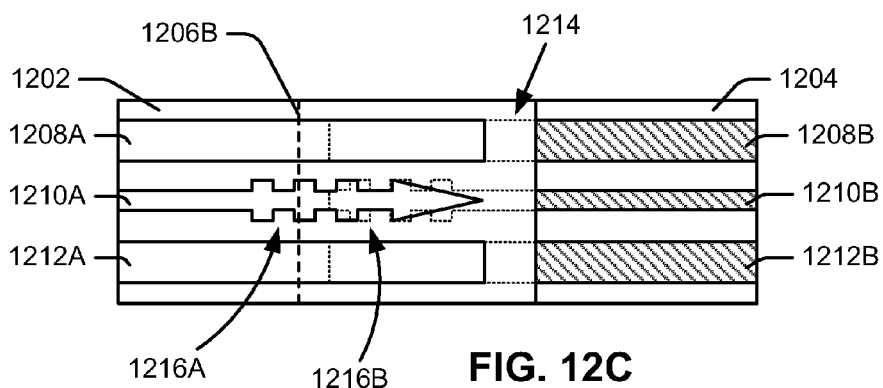
Figure 12D:
Figure 13:
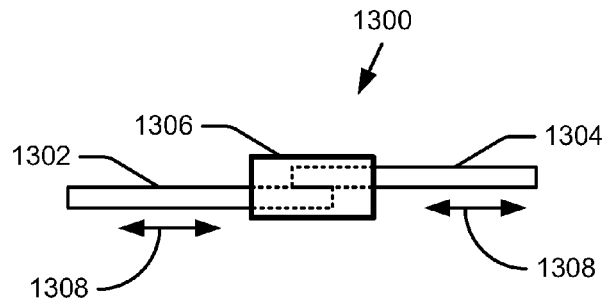
FIG. 13 is a simplified diagram illustrating sample aspects of a flexible substrate including a mechanical coupler for coupling flexible components.

When the flexible substrate 1200 is oriented from the shape of FIG. 12B to the flatter shape of FIG. 12D, the end portions of the flexible subcomponents 1202 and 1204 may overlap to a greater extent as indicated by the dashed lines 1206A and 1206B in FIGS. 12A and 12C, respectively. Consequently, as illustrated by the dashed lines 1214 in FIG. 12C, as the end portions pass over one another, the irregular portions 1216A and 1216B may move closer to one another. As a result, the electrical characteristics of an associated circuit (e.g., a mm-wave circuit) may change in a relatively complex manner when the flexible substrate 1200 is subjected to a certain degree of angular displacement. A detector (e.g., a digital signal processor) may thus be configured to detect these complex changes in electrical characteristics to characterize the current angular displacement of the flexible substrate 1200 with, for example, more accuracy and/or greater sensitivity than approaches that do not employ complex conductors.

A multi-subcomponent flexible substrate (e.g., a described above) may include a mechanical coupler or some other suitable mechanism for coupling the subcomponents in a manner that enables the subcomponents to move relative to one another while holding the subcomponents together. For example, in the simplified drawing of FIG. 13, a flexible substrate 1300 comprising subcomponents 1302 and 1304 includes a mechanical coupler 1306 that serves to couple at least the end portions of the subcomponents 1302 and 1304. For example, the mechanical coupler 1306 may comprise a sleeve-like structure that wraps around the periphery of the subcomponents 1302 and 1304 but allows at least one of these subcomponents to slide (e.g., as indicated by the arrows 1308) in a relatively linear manner along a longitudinal axis of the flexible substrate 1300. In some implementations the mechanical coupler 1306 may include flexible tension structures (not shown) that are coupled to each of the subcomponents 1302 and 1304 that allow some relative movement but restrict movement beyond a certain point.

In some implementations the flexible substrate 1300 may be configured to facilitate relative movement between its components. For example, one or more of the mechanical coupler 1306 and the subcomponents 1302 and 1304 may include a coating, outer layer, or coverlay (e.g., made of Teflon or some other suitable material) that enables a subcomponent to easily slide against a surface of another component (e.g., another subcomponent and/or the mechanical coupler 1306). Alternatively, one or more of these components may be constructed of such a material (e.g., the flexible subcomponents 1302 and 1304 may be implemented using a Teflon dielectric medium).

Figure 14A:
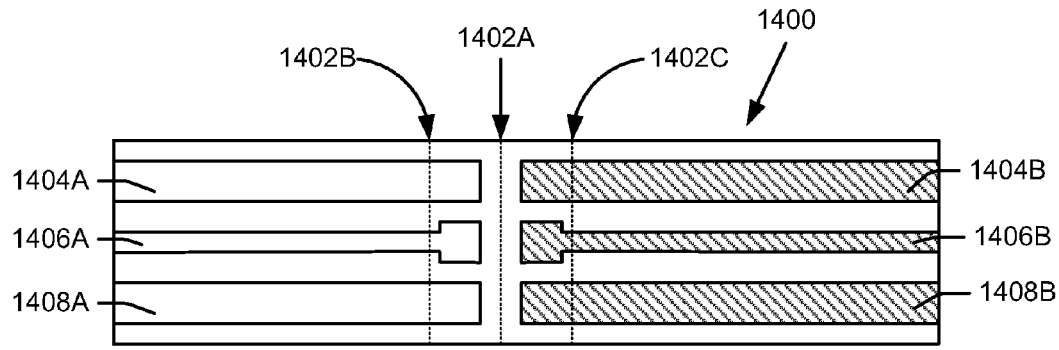
FIGS. 14A, 14B, and 14C are simplified diagrams illustrating sample aspects of a flexible substrate including a foldable portion.
Figure 14B:
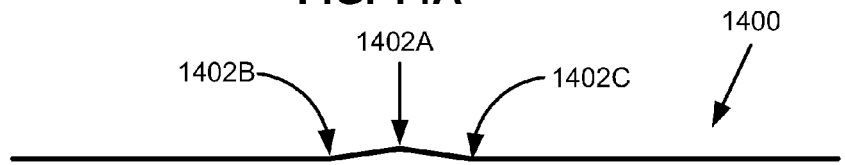
Figure 14C:
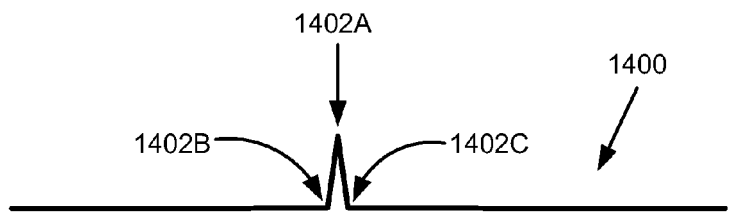

In some implementations, a flexible substrate may be configured to fold (e.g., in a similar manner as an accordion) when it is subjected to angular displacement. For example, referring to the top view of FIG. 14A illustrating a portion of a flexible substrate 1400, the flexible substrate 1400 is configured to fold along the dashed lines 1402A, 1402B, and 1402C. FIG. 14B illustrates a side view corresponding to FIG. 14A where the flexible substrate 1400 is subjected to a certain amount of angular displacement (e.g., the flexible substrate 1400 is flexed, not shown). FIG. 14C illustrates a side view where the flexible substrate 1400 is subjected to less angular displacement (e.g., the flexible substrate 1400 is not flexed).

FIG. 14A also illustrates that the left side of the flexible substrate 1400 includes conductors 1404A, 1406A, and 1408A that correspond to conductors 1404B, 1406B, and 1408B on the right side of the flexible substrate 1400. For example, the conductors 1406A and 1406B may be comprise a transmission line for a signal while the conductors 1404A, 1408A, 1404B, and 1408B may comprise ground conductors.

In the configuration of FIGS. 14A and 14B, the conductors on the left and right sides of the flexible substrate 1400 are relatively far apart. As a result, there may be little, if any, conduction of signals (e.g., mm-wave signals) between the conductors of the left and right sides of the flexible substrate 1400 (e.g., between conductors 1406A and 1406B, between conductors 1404A and 1404B, and so on).

In contrast, in the configuration of FIG. 14C, the end portions of corresponding left side and right side conductors are closer to one another. Consequently, there may be more signal conduction between the left and right side conductors in this case (e.g., between conductors 1406A and 1406B, between conductors 1404A and 1404B, and so on).

Thus, it may be seen that the extent of the change in conductor overlap or proximity may depend on the extent to which the flexible substrate is displaced. Again, such a change in the spacing between the conductors and/or in the length of the overall transmission path may cause a corresponding change in the electrical properties of an electrical circuit (e.g., a mm-wave circuit) including these conductors. Accordingly, a detector may employ the signal detection techniques taught herein to determine the current angular displacement of the flexible substrate based on these electrical property variations.

A flexible substrate employing folds or bends as in FIG. 14 may be implemented in various ways. For example, a flexible substrate may include one or more series of bends (e.g., more than three bends) along its length. Also, various techniques may be used to form the bends in the flexible substrate. For example, laser drilling or some other suitable technique may be used to form a series of holes along a desired fold line. In addition, bending may be achieved through the use of a thinner or less rigid material in the area where bending is desired.

A flexible substrate that may be employed in conjunction with the teachings herein may take various forms. For example, the substrate may be made of various materials including, for example, polyimide, liquid crystal polymer, a polyester-based dielectric, or some other suitable material. In addition, various techniques may be used to provide one or more conductors in a substrate. For example, a conductor may be imbedded in a substrate, attached to a surface of a substrate, or coupled with a substrate in some other manner. Hence, a substrate described herein as having multiple layers may be formed from separate layers or may be formed as a single component (e.g., where the different "layers" relate to different areas of the substrate as opposed to different layer subcomponents).

It should be appreciated that various modifications may be incorporated into the disclosed embodiments based on the teachings herein. For example, one or more of the components described in one figure (e.g., a crystal, a voltage controlled oscillator, a multi-conductor flexible substrate, and so on) may be used in an implementation shown in another figure. Also, various types of sensing circuits, signal generator circuits, flexible substrates, and electrical conductors other than those specifically mentioned above may be employed in accordance with the teachings herein.

In addition, the teachings herein may be employed in sensing devices that use signals of various frequencies. In some implementations the angular displacement of a flexible substrate may be determined through the use of signals in the range of 50-100 GHz (e.g., including the unlicensed 60 GHz band designated for point-to-point wireless systems and other wireless bands in that range). In some implementations the angular displacement of a flexible substrate may be determined through the use of signals below the mm-wave range.

Furthermore, it should be appreciated that a sensing device as taught herein may be configured to detect a shift in frequency or some other characteristic of a signal. As an example, a mm-wave circuit may comprise a circuit that is used to set the frequency of an oscillating circuit of a signal generator. In this case, displacement of the flexible substrate may cause a change in an electrical characteristic (e.g., one or more of capacitance, inductance, and resistance) of the mm-wave circuit. Consequently, this displacement may cause a corresponding change in the operating frequency of the oscillating circuit. A signal processing circuit of a detector (e.g., the detector circuit 108 configured as a frequency detector) may then be configured to detect such a shift in frequency.

Also, a change in a circuit parameter caused by displacement of a flexible substrate may be achieved in various ways. For example, as mentioned above a flexible substrate may incorporate a mechanically sensitive dielectric whereby a displacement of the flexible substrate causes the dielectric constant to change. Also, a flexible substrate may employ waveguide patterns that alter signal characteristics (e.g., phase and/or amplitude) upon displacement of the flexible substrate. For example, such a pattern may amplify any phase difference that occurs when the flexible substrate is displaced.

It also should be appreciated that the various structures and functions described herein may be implemented in various ways and using a variety of apparatuses. For example, a device may be implemented by various hardware components such a processor, a controller, a state machine, logic, or some combination of one or more of these components.

In some embodiments, code including instructions (e.g., software, firmware, middleware, etc.) may be executed on one or more processing devices to implement one or more of the described functions or components. The code and associated components (e.g., data structures and other components by the code or to execute the code) may be stored in an appropriate data memory that is readable by a processing device (e.g., commonly referred to as a computer-readable medium).

The recited order of the blocks in the processes disclosed herein is simply an example of a suitable approach. Thus, operations associated with such blocks may be rearranged while remaining within the scope of the present disclosure. Similarly, the accompanying method claims present operations in a sample order, and are not necessarily limited to the specific order presented.

The components and functions described herein may be connected or coupled in various ways. The manner in which this is done may depend, in part, on whether and how the components are separated from the other components. In some embodiments some of the connections or couplings represented by the lead lines in the drawings may be in an integrated circuit, on a circuit board or implemented as discrete wires, or in some other way.

The signals discussed herein may take various forms. For example, in some embodiments a signal may comprise electrical signals transmitted over a wire, light pulses transmitted through an optical medium such as an optical fiber or air, or RF waves transmitted through a medium such as air, etc. In addition, a plurality of signals may be collectively referred to as a signal herein. The signals discussed above also may take the form of data. For example, in some embodiments an application program may send a signal to another application program. Such a signal may be stored in a data memory.

Also, it should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements.

While certain sample embodiments have been described above in detail and shown in the accompanying drawings, it is to be understood that such embodiments are merely illustrative of and not restrictive of the teachings herein. In particular, it should be recognized that the teachings herein may apply to a wide variety of apparatuses and methods. It will thus be recognized that various modifications may be made to the illustrated and other embodiments as taught herein, without departing from the broad inventive scope thereof. In view of the above it will be understood that the teachings herein are not limited to the particular embodiments or arrangements disclosed, but are rather intended to cover any changes, adaptations or modifications which are within the scope of the appended claims.

What is claimed is:

1. An apparatus for determining angular displacement, comprising:
    a flexible substrate including at least one electrical conductor of a mm-wave circuit; and
    a signal processing circuit configured to generate an indication of angular displacement of the flexible substrate based on an electrical change to a mm-wave signal applied to the mm-wave circuit.

2. The apparatus of claim 1, wherein:
    the electrical change relates to a change in phase of the mm-wave signal; and
    the signal processing circuit comprises a phase detector coupled to the mm-wave circuit and configured to provide an output signal indicative of the change in phase.

3. The apparatus of claim 1, wherein:
    the electrical change relates to a change in amplitude of the mm-wave signal; and
    the signal processing circuit comprises an amplitude detector coupled to the mm-wave circuit and configured to provide an output signal indicative of the change in amplitude.

4. The apparatus of claim 1, wherein:
    the electrical change relates to a change in frequency of the mm-wave signal; and
    the signal processing circuit comprises a frequency detector coupled to the mm-wave circuit and configured to provide an output signal indicative of the change in frequency.

5. The apparatus of claim 1, wherein:
    the mm-wave signal comprises a reflected pulse signal;
    the electrical change relates to timing and/or shape of the reflected pulse signal; and
    the signal processing circuit comprises a pulse detector coupled to the mm-wave circuit and configured to provide an output signal indicative of the timing and/or shape of the reflected pulse signal.

6. The apparatus of claim 1, wherein:
    the at least one electrical conductor comprises a first conductor and a second conductor;
    a first layer of the flexible substrate includes the first conductor;
    a second layer of the flexible substrate includes the second conductor; and
    the first and second conductors are oriented in the flexible substrate such that the angular displacement of the flexible substrate causes displacement of at least one edge of the first conductor relative to at least one edge of the second conductor thereby inducing the electrical change.

7. The apparatus of claim 6, wherein:
    the at least one edge of the first conductor comprises a first plurality of edges;
    the at least one edge of the second conductor comprises a second plurality of edges; and
    the first and second plurality of edges are substantially parallel.

8. The apparatus of claim 6, wherein:
    the at least one edge of the first conductor comprises a first end of the first conductor;
    the at least one edge of the second conductor comprises a second end of the second conductor; and
    the displacement of at least one edge of the first conductor comprises a substantially linear displacement of the first end relative to the second end along a longitudinal axis of the flexible substrate.

9. The apparatus of claim 1, wherein the at least one electrical conductor comprises a first set of electrical conductors and a second set of electrical conductors, and the flexible substrate comprises:
    a first flexible subcomponent that includes the first set of electrical conductors;
    a second flexible subcomponent that includes the second set of electrical conductors; and
    a mechanical coupler configured to couple the first and second flexible subcomponents such that the first flexible subcomponent is able to move relative to the second flexible subcomponent;
    wherein the first and second sets of electrical conductors are respectively located in the first and second flexible subcomponents to enable coupling of the mm-wave signal from a first end portion of the first set of electrical conductors to a second end portion of the second set of electrical conductors.

10. The apparatus of claim 9, wherein the mechanical coupler is further configured to allow substantially linear displacement of the first flexible subcomponent relative to the second flexible subcomponent along a longitudinal axis of the flexible substrate.

11. The apparatus of claim 1, wherein:
    the at least one electrical conductor comprises a plurality of electrical conductors;
    the electrical conductors are positioned to enable the mm-wave signal to be coupled from a first end portion of a first one of the electrical conductors to a second end portion of a second one of the electrical conductors; and
    at least one portion of the flexible substrate adjacent the first and second end portions is configured to fold.

12. The apparatus of claim 1, further comprising a signal generator configured to generate the mm-wave signal for the mm-wave circuit.

13. The apparatus of claim 12, wherein the signal generator comprises a locked loop circuit.

14. The apparatus of claim 13, wherein the locked loop circuit comprises a crystal-driven phase locked loop.

15. The apparatus of claim 12, wherein:
    the signal generator comprises a directional coupler configured to provide the mm-wave signal for the mm-wave circuit; and the signal processing circuit is configured to detect a change in amplitude of the mm-wave signal.

16. The apparatus of claim 15, wherein the signal processing circuit is further configured to detect a change in phase of the mm-wave signal and comprises a mixer that is:
   coupled to receive the mm-wave signal of the mm-wave circuit;
   coupled to receive another mm-wave signal from another directional coupler; and
   configured to provide an output signal indicative of the change in amplitude and the change in phase.

17. The apparatus of claim 1, wherein the signal processing circuit comprises a mixer that is:
   coupled to receive a first signal from a first terminal of the mm-wave circuit;
   coupled to receive a second signal from a second terminal of the mm-wave circuit; and
   configured to provide a signal indicative of a phase difference between the first and second signals.

18. The apparatus of claim 17, wherein the signal processing circuit comprises:
   a filter configured to filter the signal provided by the mixer to provide a filtered signal;
   an analog-to-digital converter configured to provide a digital signal based on the filtered signal; and
   a digital signal processor configured to process the digital signal to provide the indication of angular displacement.

* * * * *